March 31, 1970     L. ABRAMS     3,503,345

PRE-FORMED CAKE ICING AND METHOD OF MAKING SAME

Filed Feb. 20, 1968

INVENTOR.
LOUIS ABRAMS
BY

*Hauke Kraus Gifford & Patalidis*
ATTORNEYS

United States Patent Office 3,503,345
Patented Mar. 31, 1970

3,503,345
PRE-FORMED CAKE ICING AND METHOD OF MAKING SAME
Louis Abrams, 20664 Knob Woods Drive, Apt. 211, Southfield, Mich. 48075
Filed Feb. 20, 1968, Ser. No. 706,813
Int. Cl. A23g *3/00*
U.S. Cl. 107—54    12 Claims

ABSTRACT OF THE DISCLOSURE

A method for decorating a cake by pre-forming a disk of icing, freezing the disk so that it hardens to facilitate handling, and then placing it on the cake so that it softens to form the top of the cake.

BACKGROUND OF THE INVENTION

This invention relates to a pre-formed cake top and to a method for pre-forming the cake top in the form of a frozen self-supporting disk of icing which is placed on the top of a cake as a part of the cake decorating process.

The conventional commercial cake-making process employs a great deal of manual effort in coating the cake with icing and in applying an appropriate decoration on the icing. Each cake is coated while either mounted on a turntable or held in the hand of the decorator who applies the icing on the top and sides of the cake. The icing is applied either by hand or with a spatula so as to cover the cake. The excess icing is removed and the top surface smoothed if a decoration is to be deposited. The decoration is then applied by methods which also utilize substantial manual effort.

There are a number of problems associated with the conventional cake decorating methods. For instance, when a holiday season approaches, the bakeries must stockpile cakes in advance in order to meet the sudden increase in demand. The cakes are usually frozen in order to maintain their freshness. This requires substantial frozen storage facilities.

In addition to the high degree of manual skill required to spread the icing on the cakes with a desired thickness and surface, manual decorating methods are very time consuming, even with skilled decorators. Some attempts have been made in the past to pre-form a layer of icing before it is applied to the cake, however such efforts have proven commercially unsuccessful. It is the broad purpose of the present invention to reduce the costs of commercially decorating cakes by improving the methods for applying the icing on the cake by employing a pre-formed disk of icing.

SUMMARY

The preferred method illustrating the invention employs a frozen disk of icing that can be pre-formed either at the bakery or at some other facility. The disks are preferably made on a moving conveyor belt which moves over a supporting surface. A continuous strip of wax paper is mounted on the belt and a series of plastic mold plates, each having a central opening, is placed on the wax paper. Each mold plate has a predetermined thickness corresponding to the desired thickness of a finished disk of icing. The perimeter of the central opening corresponds to the border of the cake's upper surface. If the cake has a circular top the opening is round, however the opening could be square or take other geometrical shapes, depending on the shape of the cake. The resulting disc has the same size and shape as the top of the cake.

Each mold plate is then advanced to a filling station where a charge of relatively soft conventional icing, of any suitable color, is poured into the cavity formed by the central opening. The cavity is overfilled and the mold plate is advanced to a wiping station where the upper surface of the mold plate is wiped so that the disk assumes its final shape with the thickness of the mold plate and the shape of the opening. The disk is separated from the mold plate and deposited in a freezing means so that it hardens. The hardened disk is self-supporting so that it is easy to handle and place on top of the cake. When placed on top of the cake at room temperature, the disk softens so that it readily takes the shape of the cake's surface. The preferred method produces a cake top having a smooth upper surface and a uniform predetermined thickness, thereby eliminating waste. The process readily lends itself to a high production rate as compared to time-consuming conventional manual methods.

The disks can be pre-formed and decorated in facilities remote from the bakery and then sold in supermarkets to purchasers who bake their own cake in the home and then apply the disk. Thus the housewife who may be fairly successful in baking a cake but who is not skillful enough to perform a professional decorating job can bake her own cake and then purchase the decorated disk of icing for application to her cake.

Still other advantages of the present invention will readily occur to one skilled in the art to which the invention pertains upon reference to the following detailed description.

DESCRIPTION OF THE DRAWING

The description refers to the accompanying drawing in which like reference characters refer to like parts throughout the several views and in which.

DESCRIPTION OF THE PREFERRED EMBODIMENT

Figure 1:
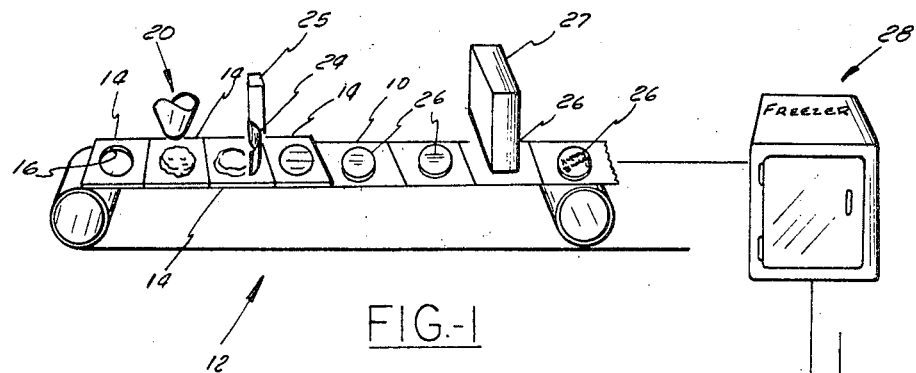
FIGURE 1 is a schematic view of a cake-decorating process illustrating the preferred method.
Figure 2:
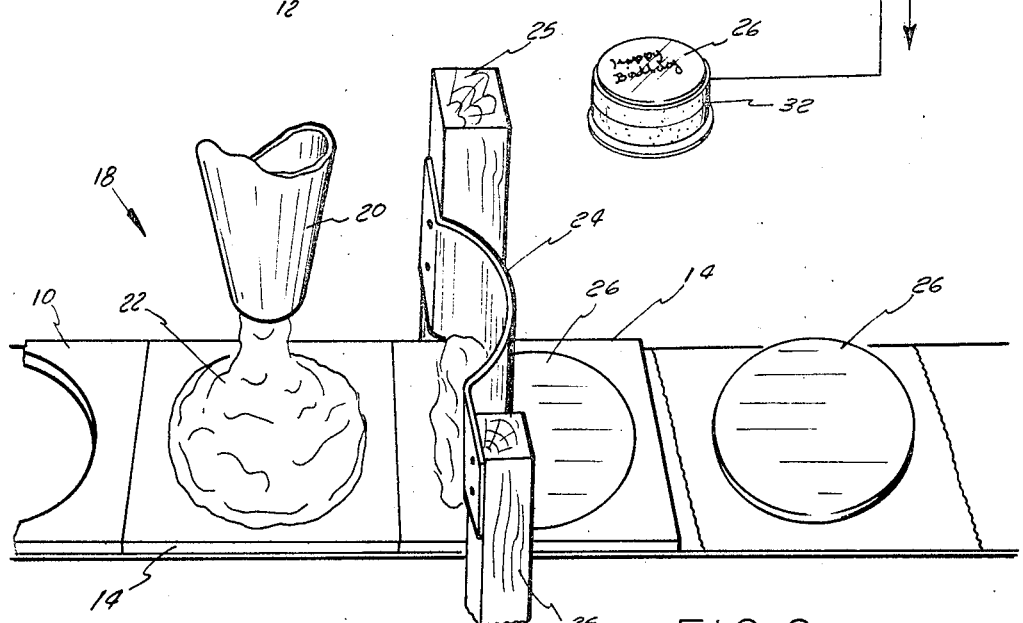
FIGURE 2 is an enlarged view of a portion of the process illustrated in FIGURE 1.

Now referring to the drawings, the preferred method is described with reference to a commercial cake making process and comprises feeding an endless sheet of wax paper 10 on a conveyor means generally indicated at 12. The wax paper is transversely perforated at suitable and regular intervals. A continuous series of flat mold plates 14 are laid on the wax paper 10 and supporting surface provided by the conveyor belt. Each mold plate 14 is preferably of plastic and has a predetermined thickness corresponding to the final thickness of the finished disk of icing.

As each mold plate 14 is mounted on the wax paper 10, its opening 16 forms a mold cavity for receiving a charge of icing. The openings 16 is illustrated as being circular, however it could take other shapes to accommodate the top of the cake on which it will be mounted. The diameter of the opening 16 corresponds with the diameter of the cake. Each mold plate is advanced by the conveyor means 12 to a filling station 18 where dispensing means 20 introduces a charge of relatively soft cake icing 22 into the cavity formed by the mold plate 14. The icing 22 is of any suitable color and formed of conventional ingredients into a creamy-like mixture like a whipped cream. The icing 22 is characterized as relatively spreadable at room temperatures and becomes hardened when introduced into a relatively cold atmosphere.

The cavity is preferably overfilled and the mold plate 14 is advanced with the overfilled cavity below a wiping member 24. The wiping member 24 is mounted by a pair of supports 25 so that its lower edge engages the upper flat surface of the mold plate 14 and wipes the plate to remove the excess icing leaving a disk 26 having a flat upper surface. Preferably the wiping member 24 has a generally semicylindrical shape with its concave surface facing in the direction of the approaching mold plate. The width of the wiping member 24 is greater than the diameter of the opening 16 so that the disk 26 has a thickness corresponding to the thickness of the mold plate. When the mold plate 14 and the disk 26 have passed the wiping station, the mold plate 14 is raised and separated from the disk 26 and the wax paper and then return to its initial position on the conveyor. Each disk is advanced past suitable decorating means 27 which deposits an appropriate decoration on its upper surface.

Thus it can be seen that each disk produced by the preferred process has a uniform thickness and consistent dimensions. Each disk 26, while still in a relatively soft state, and its sheet of wax paper is then separated from the conveyor 12 by tearing the wax paper along a line of perforation. The disks are transferred to freezing means 28 so that upon cooling they harden into a self-supporting stiff condition. A disk in this condition on its individual sheet of wax paper 30 is illustrated in FIGURE 3.

In its frozen state each disk 26 is stiff so that the decorator can easily handle and mount the disk on top of a baked cake 32. The disk can be mounted on the cake 32 in a commercial establishment such as a bakery or it can be individually packaged and sold in its frozen state to its ultimate consumer in supermarkets. The frozen disk 26 easily separates from the wax paper 30 for mounting on the cake 32. When placed on the cake at room temperature, the disk softens to form a coating of icing on the top surface of the cake.

Figures 3, 4:
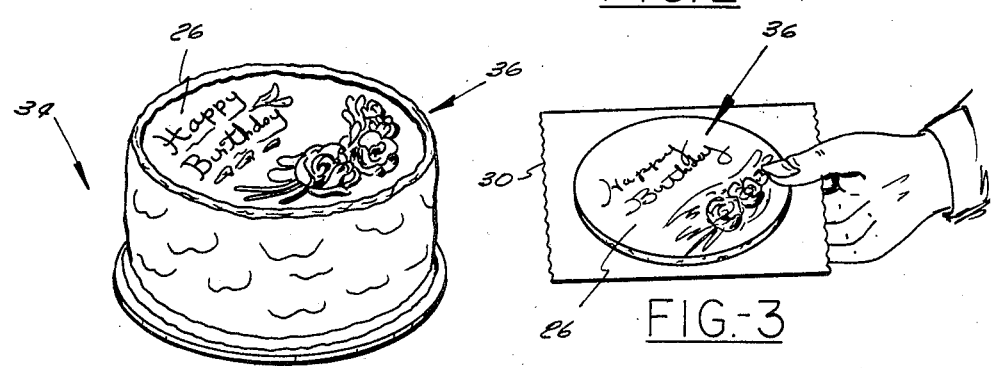
FIGURE 3 is a perspective view of a frozen disk of cake icing.
FIGURE 4 is a view of a cake decorated in accordance with the preferred method.

FIGURE 4 shows a finished decorated cake 34 which has a disk 26 on which suitable decorations 36 have been applied. The sides of the cake are coated with icing by the decorator by hand in the usual manner.

Thus it can be seen that I have described in detail a method for making a pre-formed disk of icing that eliminates considerable manual effort and insures that the disks are consistently produced with a uniform thickness and a smooth upper surface.

Although I have described but one preferred disk for making a cake top and one method for making the disk, it is to be understood that various changes and revisions can be made therein without departing from the spirit of the invention.

Having thus described my invention, I claim:

1. A method for decorating a cake, comprising the steps of:
    (a) forming a disk-like layer of icing having a perimeter generally corresponding to the perimeter of the cake in a mold, the icing having a relatively soft state at room temperature and a relatively hard state in a cold atmosphere;
    (b) disposing the disk in its relatively soft state into a freezing means for a sufficient time to harden and assume a self-supporting state; and
    (c) mounting the disk in its hardened state on top of the cake and allowing it to soften at room temperature so as to form a coating with the top surface of the cake.

2. A method for decorating a cake as defined in claim 1, wherein said disk is formed in mold means, separated from the mold means and then disposed in the freezing means.

3. A method for decorating a cake as defined in claim 1, including the step of applying a decoration on the disk prior to disposing the disk in the freezing means.

4. A method for decorating a cake as defined in claim 1, including the steps of forming a mold cavity having an open top with a planar wiping surface, overfilling the cavity with soft icing, wiping the wiping surface to remove the excess icing and form the upper surface of the disk co-planar with the wiping surface of the mold.

5. A method for decorating a cake as defined in claim 1, including the steps of forming a mold cavity by mounting a mold plate having an opening with a predetermined boundary on a mounting surface to form an open topped mold cavity, disposing the soft icing into the mold cavity to form a disk of icing having the perimeter of the opening, and then removing the mold plate from the supporting surface and the disk.

6. A method for decorating a cake as defined in claim 5, including the step of disposing a layer of wax paper on the supporting surface below the mold plate so that the disk is formed on wax paper.

7. A method for making a layer of icing as defined in claim 5, wherein the mold plate has a predetermined thickness and including the step of wiping the upper surface of the mold plate after the filling step so that the disk has a thickness corresponding to the thickness of the mold plate and a flat upper surface.

8. A method for decorating a cake comprising the steps of:
    (a) mounting a mold plate having a predetermined thickness and an opening with a perimeter generally corresponding to the perimeter of the top of the cake on a supporting surface to form an open topped mold cavity;
    (b) overfilling the mold cavity with relatively soft icing capable of hardening in a cold atmosphere;
    (c) wiping the top of the mold plate over the mold cavity to form a disk of icing having a thickness corresponding to the thickness of the mold plate;
    (d) separating the disk from the mold plate and the supporting surface,
    (e) disposing the disk in freezing means so as to harden the disk; and
    (f) mounting the hardened disk on the cake, so that it softens to form an integral coating for the cake.

9. A method as defined in claim 8, wherein the supporting surface is moved past a series of stations including a first station where the mold plate is mounted on the surface to form a mold cavity, a filling station where the cavity is overfilled with a charge of soft icing, and a wiping station where a wiping member forms the upper surface of the disk co-planar with the surface of the mold plate.

10. A method of decorating a cake as defined in claim 9, wherein said wiping member comprises a partially cylindrical member mounted over the path of the moving mold plate with its concave surface facing the approaching mold plate and its lower edge engaging the surface of the mold plate.

11. An article of manufacture consisting essentially of a planar disk of edible icing having sufficient strength so as to be substantially self-supporting and having a plurality of edible decorative elements attached to one side thereof, such disk being adapted to be disposed on the upper surface of a cake so as to decorate a cake.

12. The article of claim 11 wherein the disk is self-supporting by virtue of its being in a frozen state.

References Cited

UNITED STATES PATENTS

| | | | |
|---|---|---|---|
| 2,394,322 | 2/1946 | McKee | 99—92 |
| 2,435,047 | 1/1948 | McKee | 99—92 |
| 2,895,832 | 7/1959 | Bersey | 99—138 XR |
| 788,222 | 4/1905 | Scott et al. | |
| 2,085,728 | 7/1937 | Clark. | |

FOREIGN PATENTS 29,295  12/1904  Great Britain.

WALTER A. SCHEEL, Primary Examiner
R. I. SMITH, Assistant Examiner

U.S. Cl. X.R.

99—137; 107—1